United States Patent Office 2,908,477
Patented Oct. 13, 1959

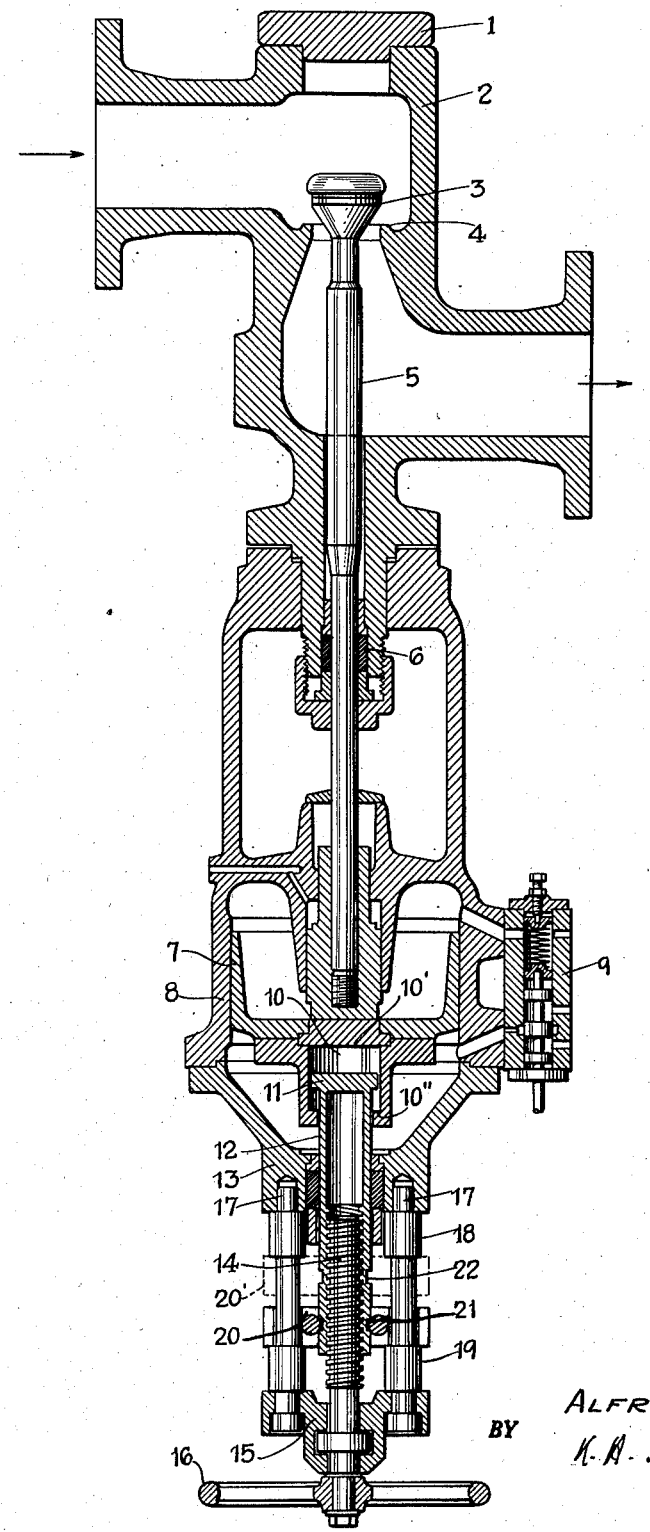

2,908,477
VALVE MECHANISM

Alfred Buri, Winterthur, Switzerland, assignor to Sulzer Frères, Societe Anonyme, Winterthur, Switzerland, a corporation of Switzerland Application October 11, 1954, Serial No. 461,626

3 Claims. (Cl. 251—14)

The present invention relates to a valve adapted to be automatically controlled by a servomotor.

The valve mechanism according to the invention includes a manually operable first abutment means for limiting the movements of the valve produced by a servomotor and a second adjustable abutment means for limiting the operation of the first abutment means.

Valve mechanisms with which the present invention is concerned are in use in various fields for controlling the flow of steam, water, etc. Valves are used in steam plants for different purposes. The personnel operating such plants is not always fully familiar with the function and purpose of the individual valves, and it must be prevented by all means that a valve is operated in such a manner as to cause danger. There are valves which must not be fully closed during certain periods of time, but must provide a predetermined minimum flow area. The first abutment means described in the preceding paragraph must not be set beyond a predetermined position, which position can be determined by the second abutment means provided according to the invention. There are other valves which, at certain times, for example during starting of parts of the steam plant, should open only a little, and which must always be open to a certain degree. Also in this case, the extent of the movement of the manual means for adjusting the first abutment must be limited, the limitation being effected by the second abutment means. In some cases, it is desirable to limit the stroke of the valve, so that it cannot be lifted from its seat by the servomotor to such an extent that the flow area of the valve becomes too great for the rest of the plant, or that the valve may make contact with the interior of the valve casing, causing damage. In this case, the limitation of the movement of the first abutment by means of a second abutment according to the invention is also of advantage.

The valve mechanism according to the invention may include a threaded sleeve which can be axially moved by means of a rotatable threaded rod, the first abutment being provided at one end of the sleeve. The second abutment may be clamped to the sleeve in different selectable positions. In a preferred embodiment of the invention, the second abutment may be adapted to be fixed to the sleeve in two different positions. The first abutment may be so constructed, that the valve can be actuated thereby in lieu of or in combination with the servomotor. The second abutment may be fixed in a first position in which the valve can be opened by hand but cannot be closed by hand; the second abutment may be fixed in a second position, so that the valve can be closed by hand, but cannot be opened by hand.

The last-described arrangements are of particular advantage, for example in connection with a steam valve. The valve may normally be freely actuated by the servomotor. The position of the second abutment, however, may be such that in case of danger the valve can be closed by means of the first abutment and maintained closed and cannot be opened by manual operation of the first abutment. When in the second position, the second abutment may serve to temporarily afford the opening of the valve by hand and maintaining the open position, for example at times when the servomotor is removed for overhauling or repair, so that it is not necessary to discontinue operation of, for example, a steam boiler which is served by the valve.

The novel features which are considered characteristic of the invention are set forth with particularity in the appended claims. The invention itself however and additional objects and advantages thereof will best be understood from the following description of an embodiment thereof when read in conjunction with the accompanying drawing whose single figure is a longitudinal sectional view of a steam valve as it may be used in connection with steam boiler plants.

Referring more particularly to the drawing, numeral 1 designates a cover for closing a valve casing 2. The flow area of the valve is determined by the distance of the valve member 3 from the valve seat 4. The valve 3 is at the end of a valve rod 5 which projects from the casing 2, a stuffing box 6 being provided to close the interior of the valve casing. The lower end of the valve rod 5 carries an actuating piston 7 which slides upward and downward in a control cylinder 8, forming a conventional fluid actuated servomotor controlled by a pilot valve 9. An attachment on the lower end of the control piston 7 forms a chamber 10 having an upper abutment surface 10' and an internal shoulder forming a lower abutment surface 10". A first abutment 11 at the upper end of an internally threaded sleeve 12 extends into the chamber 10. The sleeve is guided in a cover 13 closing the bottom of the control cylinder 8 and can be moved upward and downward by rotating a threaded rod 14. The latter is rotatably supported on a bridge member 15 and can be rotated by manipulation of a hand wheel 16. Guide rods 17 connect the collar 13 and the bridge member 15, each rod having two collars 18 and 19. A locking member or second abutment 20 can be clamped to the sleeve 12 either at the position shown in solid lines or at the position 20' shown in dotted lines, the positions being determined by annular recesses 21 and 22 on the outside of the sleeve 12. The locking member is slidable on the rods 17, its movement being limited by the collars 18 and 19, so that the movement of the sleeve 12 and of the abutment 11 is limited accordingly.

For selectively mounting the element 20 on the member 12, either in the position shown in solid lines in the drawing which position is defined by the groove 21 or in the position shown in dotted lines which position is defined by the groove 22, the element 20 is split in a plane containing the axes of the rods 14 and 17. After placing the two halves of the element 20 to engage the selected groove or recess 21 or 22 the two halves may be firmly connected, for example, by screws.

During normal operation, the abutment 11 is in the position shown in the drawing. The piston 7 and the valve 3 connected therewith can be freely operated by the servomotor 7, 8. The outward or downward movement of the piston 7 and of the valve rod 5 connected therewith is limited by the valve seat 4. The upward movement of the valve is limited by contact of the surface 10" with the abutment 11. The locking member 20 may be fixed in the recess 22 and be in the position shown in dotted lines. If, in case of danger, the valve must be closed, this can be done by rotating the wheel 16, so as to move the sleeve 12 downward. After a few revolutions, the abutment 11 will contact the lower surface 10" of the chamber 10 pulling the valve 3 onto the seat 4. An inadvertent opening of the valve is not possible, as the valve cannot be pushed upward so long as the locking member 20 is in the position 20'.

If the locking member 20 is fixed to the sleeve 12 in the position shown in solid lines, manual closing of the valve is prevented. If the abutment 11 is slightly moved upward from the illustrated position, the valve 3 is not seated on the seat 4. In this case, the pilot valve may be removed, for example, for overhauling or repair, without interrupting the operation of the steam plant. The valve cannot be closed inadvertently, but can be opened by hand, in which case the abutment 11 presses against the upper surface 10′ in the chamber 10. This operation may become necessary in the case of failure of the servo-motor or its pilot valve.

While a specific embodiment of the invention has been shown and described, it will be apparent to those skilled in the art that various changes, modifications, substitutions, additions and omissions may be made therein without departing from the spirit and scope of the invention as set forth in the appended claims.

What is claimed is:

1. A valve mechanism comprising a valve stem axially movable in a valve opening and a valve closing direction, a power cylinder, a power piston reciprocatingly movable in said cylinder and connected with said stem for axially moving said stem by remote control, two axially spaced abutments connected with said piston, a member reciprocably movable coaxially of said valve stem and including a portion abutting against one of said abutments when said member is in one extreme position and abutting against the other of said abutments when said member is in the other extreme position, manually operable means operatively connected with said member for moving the latter coaxially of the valve stem and axially moving said valve stem in one direction upon abutment of said portion against one of said abutments and moving said valve stem in the opposite direction upon abutment of said portion against the other of said abutments, two axially spaced stationary abutments placed alongside said member, and an abutment element connected with said member between and adapted to abut against said stationary abutments for limiting the axial movement of said member in the closing direction and in the opening direction of the movement of the valve stem.

2. A valve mechanism as defined in claim 1 including a hollow cylindrical part connected with the side of said piston which side is opposite to the side to which said valve stem is connected, said part having an internal shoulder axially spaced from said piston and forming one of said two axially spaced abutments, said member being in the form of an internally threaded sleeve extending into said part and having an abutment adapted to abut against said shoulder, said manually operable means being in the form of an axially immovable threaded rod which is screwed into said sleeve.

3. A valve mechanism as defined in claim 1 including means mounting said abutment element on said member in one position for limiting movement of said member and of said piston by the manually operable means in the valve closing direction and means whereby said abutment element can be mounted on said member in a second position, axially spaced from said first position for limiting movement of said member and of said piston in the valve opening direction.

References Cited in the file of this patent

UNITED STATES PATENTS

| | | |
|---|---|---|
| Re. 19,151 | Saunders | May 1, 1934 |
| 489,799 | Ford | Jan. 10, 1893 |
| 1,272,384 | Conrader | July 16, 1918 |
| 1,420,664 | Maxwell | June 27, 1922 |
| 2,168,255 | Bischoff | Aug. 1, 1939 |
| 2,319,336 | McCullough | May 18, 1943 |
| 2,584,847 | Dahl | Feb. 5, 1952 |
| 2,646,074 | Hopkins | July 21, 1953 |

FOREIGN PATENTS

| | | |
|---|---|---|
| 3,372 | Great Britain | of 1892 |